2,883,396
Patented Apr. 21, 1959

2,883,396

HEMIACETAL ESTER EPOXIDES

Benjamin Phillips, Charleston, and Donald L. Heywood, South Charleston, W. Va., assignors to Union Carbide Corporation, a corporation of New York No Drawing. Application March 14, 1957
Serial No. 645,900

13 Claims. (Cl. 260—348)

This invention is directed to novel hemiacetal ester epoxides and, more particularly, to aldehyde epoxyalkyl hemiacetal esters.

Our aldehyde epoxyalkyl hemiacetal esters, hereinafter to be referred to also as the epoxides, can be represented by the formula:

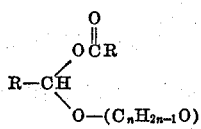

wherein R is a monovalent hydrocarbon group from the class of saturated aliphatic and monocyclic aromatic groups free from olefinic or acetylenic unsaturation and need not be the same throughout the same molecule and —($C_nH_{2n-1}O$) is an epoxyalkyl group wherein O represents oxirane oxygen and $n$ is an integer from 3 to 18. By the term "epoxyalkyl," as used herein, is meant an alkyl group to one pair of vicinal carbon atoms of which oxirane oxygen is attached. Preferred aldehyde epoxyalkyl hemiacetal esters are those represented by the foregoing formula in which each R contains from 1 to 17 carbon atoms, particularly 1 to 12 carbon atoms, since acetals having more than 18 carbon atoms, while being useful, are not economically feasible. Preferred epoxides are those in which the R groups are alkyl or aryl as, for example, the alkylaldehyde epoxyalkyl hemiacetal alkanoates, arylaldehyde epoxyalkyl hemiacetal alkanoates, alkylaldehyde epoxyalkyl hemiacetal arylcarboxylates and the arylaldehyde epoxyalkyl hemiacetal arylcarboxylates. Particularly preferred epoxides are the alkylaldehyde epoxyalkyl hemiacetal alkanoates which can be represented by the foregoing formula wherein R represents alkyl.

The aldehyde epoxyalkyl hemiacetal esters are attractively useful in the manufacture of high purity alkanetriols such as glycerol, 1,9,10-octadecanetriol, 2-ethyl-1,2,3-hexanetriol and the like. In this connection our epoxides readily hydrolize under reflux at atmospheric pressure in water containing 1 weight percent aqueous hydrogen chloride to form 1 molecule of the corresponding alkanetriol, one molecule of carboxylic acid, and one molecule of the corresponding aldehyde for each molecule of the epoxide hydrolyzed. Water, hydrogen chloride, and organic by-products can then be stripped at reduced pressure to give high purity alkanetriol. The alkanetriols thus formed are themselves useful materials, for example, as solvents for a variety of organic chemicals, as hardeners for epoxy resins and as intermediates in the manufacture of a large variety of chemicals. Our epoxides are also useful as heat and light stabilizers for chlorine-containing resins such as polyvinyl chloride.

Our aldehyde epoxyalkyl hemiacetal esters can be prepared by the epoxidation of the olefinic double bonds of corresponding aldehyde alkenyl hemiacetal esters with suitable epoxidizing agents. Typical epoxidizing agents are the peracids, e.g., peracetic acid, perpropionic acid, perbenzoic acid and the like, or the aldehyde monoperacylates, e.g., acetaldehyde monoperacetate and propionaldehyde monoperpropionate. Of these epoxidizing agents the 2 to 3 carbon aliphatic peracids, particularly peracetic acid, and the 2 to 3 carbon aliphatic aldehyde mono-(2 to 3 carbon aliphatic)peracylates, particularly acetaldehyde monoperacetate, are preferred mainly from the aspects of being economically available and capable of producing commercially acceptable yields.

The epoxidation, employing a peracid, of the aldehyde alkenyl hemiacetal ester starting materials can be represented by the equation:

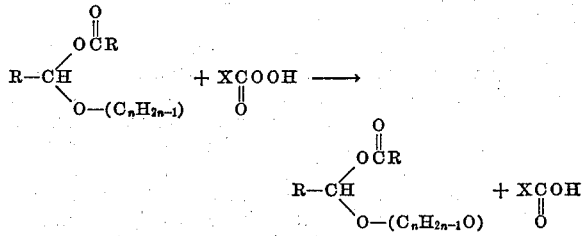

wherein R and $n$ are previously defined and

represents the peracid and

represents the peracid residue after expoxidation. Epoxidation employing an aldehyde monoperacylate takes place in a similar manner.

Many epoxidizing agents in crystalline form or highly concentrated solutions are highly explosive when exposed to physical shocks, sometimes of the very slightest magnitude. Possible explosion hazards are avoided by preventing the formation of crystalline forms or highly concentrated solutions of epoxidizing agent. This can be safely accomplished by employing in the epoxidation solutions containing below about 60 weight percent of epoxidizing agent. Ethyl acetate and acetone are two of the many solvents available for peracetic acid or acetaldehyde monoperacetate. It is particularly important that the epoxidation be carried out in the absence of heavy metal ions or strong acids and water so as to avoid the hydrolysis of the easily hydrolyzable hemiacetal ester starting materials and products.

The epoxidation is advantageously carried out at temperatures in the range of —10 to 100° C. At temperatures below this range expoxidation takes place at a very slow rate and above this range side reactions produce undesired materials and reduce the yield. Molar ratios of epoxidizing agent to aldehyde alkenyl hemiacetal ester starting material can be varied over a wide range, for example, from 0.3 to 2.0, with molar ratios between 0.8 and 1.2 being preferred, however. Molar ratios above 2.0 may be employed, although the formation of other materials brought about by such higher ratios require extensive separation methods. Molar ratios below 0.3 may also be employed but the low yield of product makes the use of such ratios impractical. The epoxidation time required to produce our aldehyde epoxyalkyl hemiacetal esters will depend upon the epoxidation temperature, the molar ratios employed and the yield desired. Any suitable method for isolating the product, such as, fractionation, crystallization and the like can be employed.

A typical epoxidation which uses acetaldehyde allyl hemiacetal acetate as starting material to produce acetaldehyde glycidyl hemiacetal acetate illustrates the method used to produce the several aldehyde epoxyalkyl hemiacetal esters of our invention. In this typical epoxidation, a 24.4 weight percent solution of peracetic acid in ethyl acetate was added continuously over a period of 2 hours to acetaldehyde allyl hemiacetal acetate. The molar ratio of peracetic acid to acetaldehyde allyl hemiacetal acetate was about 1.0 and the total weights of the respective reactants were 84.5 grams of peracetic acid and 144 grams of acetaldehyde allyl hemiacetal acetate. The temperature of the reaction mixture during the addition of peracetic acid was maintained at about 89° C. to 99° C. and the mixture was continually stirred throughout the addition. After adding all of the peracetic acid, titration to determine peracetic acid by conventional methods indicated that the theoretical amount of peracetic acid had been consumed. The reaction mixture was then cooled to room temperature.

The cooled reaction mixture was fed into ethylbenzene refluxing at reduced pressure and stripped of low-boiling materials, e.g., ethyl acetate, unreacted peracetic acid and acetic acid (as an azeotrope with ethylbenzene) leaving a residue. The residue was then fractionated to provide 53 grams of acetaldehyde glycidyl hemiacetal acetate. This amount of product represented a 33 percent yield based on theoretical. Acetaldehyde glycidyl hemiacetal acetate, thus formed, had a boiling point of 59° C. to 68° C. at a reduced pressure of 1.9 millimeters of mercury and a sodium light index of refraction of 1.4220 at 30° C. A purity of 97.9 percent was determined for the product by determination of the saponification equivalent in the presence of phenylhydrazine. An elemental analysis indicated a calculated C and H content for $C_7H_{12}O_4$ of 52.5 percent C and 7.50 percent H and a determined C and H content of 53.1 percent C and 8.00 percent H.

Similar epoxidations can be performed on other aldehyde alkenyl hemiacetal esters with, however, the replacement of acetaldehyde allyl hemiacetal acetate, respectively, by acetaldehyde 2-methallyl hemiacetal acetate, acetaldehyde crotyl hemiacetal propionate, butyraldehyde 2-ethyl-2-hexenyl hemiacetal acetate, stearaldehyde allyl hemiacetal caproate, propionaldehyde allyl hemiacetal stearate, benzaldehyde oleyl hemiacetal acetate, acetaldehyde allyl hemiacetal benzoate, benzaldehyde crotyl hemiacetal stearate, 2,4,6-triethylbenzaldehyde allyl hemiacetal 2-ethylhexanoate, and acetaldehyde crotyl hemiacetal 6-phenyl-n-caproate to produce, respectively, acetaldehyde 2-methyl-2,3-epoxypropyl hemiacetal acetate, acetaldehyde 2,3-epoxybutyl hemiacetal propionate, butyraldehyde 2-ethyl-2,3-epoxyhexyl hemiacetal acetate, stearaldehyde 2,3-epoxypropyl hemiacetal caproate, propionaldehyde 2,3-epoxypropyl hemiacetal stearate, benzaldehyde 9,10-epoxystearyl hemiacetal acetate, acetaldehyde 2,3-epoxypropyl hemiacetal benzoate, benzaldehyde 2,3-epoxybutyl hemiacetal stearate, 2,4,6-triethylbenzaldehyde 2,3-epoxypropyl hemiacetal 2-ethylhexanoate and acetaldehyde 2,3-epoxybutyl hemiacetal 6-phenyl-n-caproate. Molar ratios of peracetic acid to the respective aldehyde alkenyl hemiacetal esters, reaction temperatures and approximate reaction times of all of these epoxidations are essentially the same as the molar ratio, reaction temperature and reaction time of the acetaldehyde allyl hemiacetal acetate epoxidation described above. Separations of the products are conducted by procedures which are similar to the separation procedure described above for isolating acetaldehyde glycidyl hemiacetal acetate or by any other suitable separation methods and the percent yields and purities of product are of the same approximate magnitude.

Aldehyde alkenyl hemiacetal esters which are starting materials in the production of our aldehyde epoxyalkyl hemiacetal esters can be prepared by methods known in the art. A typical preparation of the starting materials involves the reaction of the corresponding alkenyl alcohol with an aldehyde (with catalysis by a trace of strong acid, such as, hydrochloric acid) to give the corresponding aldehyde alkenyl hemiacetal. The hemiacetal thus formed is then reacted with the corresponding acyl chloride to provide the aldehyde alkenyl hemiacetal ester starting material which can be isolated by conventional methods. Other procedures are known in the art and can be used in making our starting materials.

Methods of preparation of hemiacetal esters are also described by C. D. Hurd and F. O. Green, J. Am. Chem. Soc., 63, 2201 (1941).

What is claimed is:
1. An unsubstituted alkylaldehyde epoxyalkyl hemiacetal alkanoate.
2. An unsubstituted alkylaldehyde glycidyl hemiacetal alkanoate.
3. Acetaldehyde glycidyl hemiacetal acetate.
4. Acetaldehyde 2-methyl-2,3-epoxypropyl hemiacetal acetate.
5. Stearaldehyde glycidyl hemiacetal caproate.
6. Isobutyraldehyde 2-ethyl-2,3-epoxyhexyl hemiacetal acetate.
7. Propionaldehyde glycidyl hemiacetal stearate.
8. An aldehyde epoxyalkyl hemiacetal ester having the formula:

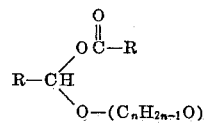

wherein R is a saturated unsubstituted monovalent hydrocarbon group selected from the group consisting of alkyl radicals containing 1 to 17 carbon atoms, phenyl, and tri-lower alkyl phenyl radicals; $—(C_nH_{2n-1}O)$ is an epoxyalkyl group wherein O represents an oxygen atom attached to vicinal carbon atoms; and $n$ is an integer from 3 to 18.
9. An unsubstituted benzaldehyde epoxyalkyl hemiacetal alkanoate.
10. An unsubstituted trialkylbenzaldehyde epoxyalkyl hemiacetal alkanoate.
11. An unsubstituted alkylaldehyde epoxyalkyl hemiacetal benzoate.
12. An unsubstituted alkylaldehyde epoxyalkyl hemiacetal tri-lower alkyl-benzoate.
13. An unsubstituted benzaldehyde 2-ethyl-2,3-epoxyhexyl hemiacetal benzoate.

No references cited.